May 23, 1944.  E. L. RIETZ  2,349,380

THRESHER CYLINDER

Filed March 20, 1941

INVENTOR
EDWARD L. RIETZ.
BY Paul O. Pippel
ATT'Y.

Patented May 23, 1944

2,349,380

UNITED STATES PATENT OFFICE 2,349,380

THRESHER CYLINDER

Edward L. Rietz, Riverside, Ill., assignor to International Harvester Company, a corporation of New Jersey Application March 20, 1941, Serial No. 384,300

2 Claims. (Cl. 130—27)

This invention relates to improvements in harvesters. More particularly it relates to improvements in the construction of the beating or threshing surfaces for a cylinder thresher. In the present day harvesters and harvester threshers, it is desirable to use a resilient material such as a rubber covering on the flail bars of the cylinder and rubber concaves. By making the rubber coating thicker where the flailing action takes place, the flail bar has longer life. It has been found that resilient surfaced flail bars and resilient concaves operate more efficiently in all crops to be harvested. The difficulty, however, with the resilient covered flail bars is that the leading or threshing edge of the resilient material on the flail bars soon wears off and the threshing efficiency thereof is considerably decreased.

With this objectionable feature in mind, it is an important object of the present invention to provide an improved resilient covering for the flail bars of a thresher cylinder.

Another object of the present invention is to provide a rubber covering for a flail bar, which covering is provided with a plurality of threshing surfaces so that, when one surface becomes worn, another surface may be put into use, thereby increasing the life and effectiveness of the flail bar.

Another object of the invention is to provide a novel means for removably and reversibly securing a resilient covering to the flail bars of a cylinder.

By virtue of these particular objects and features a longer lasting, and an improved and more efficient flail bar is provided for the cylinder of harvesters.

These and other objects and advantages of the present invention will be apparent to those skilled in the art after a consideration of the following detailed description of the preferred structural embodiment taken in conjunction with the accompanying drawing.

Figure 1:
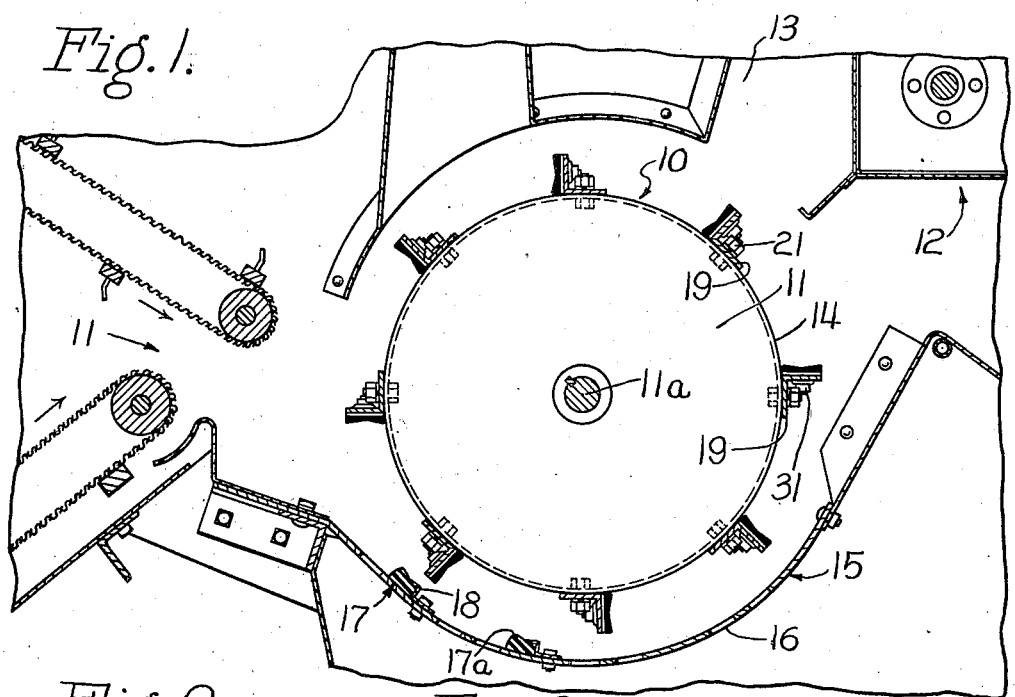
Figure 1 is a longitudinal sectional view through the separator and cylinder of a harvester, and shows the novel resilient covering provided on the flail bars of the cylinder.

Referring now to the drawing, more particularly to Figure 1, it will be seen that the thresher shown to illustrate the principles of the present invention, comprises a cylinder 10 at the front of which is provided the usual feeder 11, and at the rear of which is provided the usual beater 12. The cylinder 10 comprises a plurality of radially extending plates 11 which are secured on a shaft 11a. The shaft 11a is journaled in the sides of a separator 13 in the usual manner. In the present case, the plates 11 are provided with a flange 14 to which the flail bars are attached. Below the cylinder 10 is mounted a concave 15 which comprises a perforated plate 16 on which is secured any desired number of rubber concaves 17 by means of the clips 18. As is well known to those skilled in the art, three or four spaced plates 11a are provided on the shaft 12, and to the flanges 14 of these plates are secured, by means of bolts 21, a plurality of supports which consist of spaced angle members 19, as shown in Figure 1. The angle members 19 consist of a radially extending portion 19a and a portion 19b. The portion 19b is secured to the plates 11a by the bolts 21, and the radial portion 19a has a counter-sunk portion 22. A resilient beating member or flail bar B is associated with the portion 19a.

Figure 2:
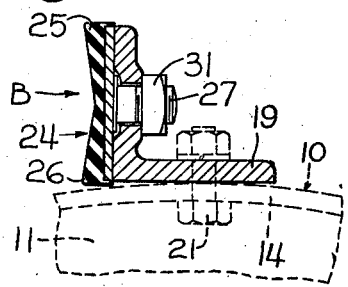
Figure 2 is a sectional view through one of the supporting members provided on the threshing cylinder and shows the rubber faced flail bar and the means for securing said rubber covering to the support.
Figure 3:
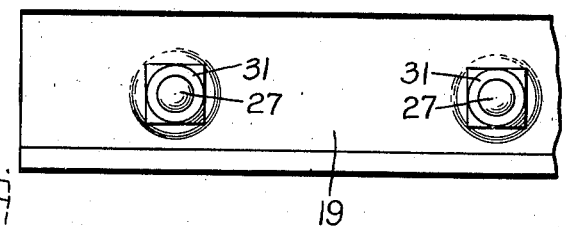
Figure 3 is a side view of the structure shown in Figure 2.
Figure 4:
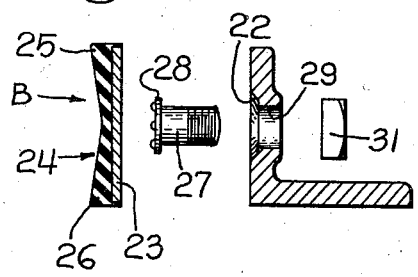
Figure 4 is an exploded view of the rubber covered flail bar, and support therefor, and the attaching means; and, Figure 5 is a sectional view showing how the threshing surface of the rubber flail bar becomes worn.
Figure 5:
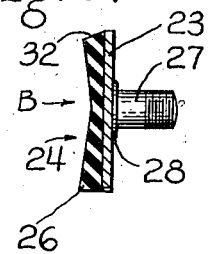

Referring now to Figure 4, it is to be noted that the resilient or rubber beating member B for the angle members 19 comprises a backing plate 23 on which is bonded a rubber covering 24, which consists of two threshing surfaces 25 and 26. The resilient covering 24 is of one thickness at its midpoint from which it radially outwardly and inwardly increases in thickness. The increased thickness forms the threshing surfaces 25 and 26. A bolt 27 having a flange 28, on which welding studs are provided, is secured by welding to the backing plate 23 in the usual manner. The backing plate 23, with the bolts 27 welded thereto, meshes with a plurality of openings 29 provided in the angle member 19. Nuts 31 are threaded on the bolts 27 so as to hold the backing plate 23 on the angle member 19, as shown in Figure 2. Referring again to Figure 1, it should be noted that when the beating surface B is secured to the angle members 19 the threshing surface 25 is adapted to move in an arc about the shaft 11a adjacent the threshing surface 17a of the rubber concaves 17. As grain is fed into the machine by the feeder 11, the rubber covering 24 pulls the grain into the concave against the threshing surfaces 17a thereof and out toward the beater 12. The grain that is threshed as it passes between the rubber covered flail bars and the rubber concaves falls through the openings provided in the perforated plate 16 of the concave in the usual manner. It will be appreciated, however, that the threshing surface 25 of the beating member A will soon become worn, as is indicated at 32 in Figure 5, in which case the threshing efficiency of the rubber covering is greatly reduced. When the threshing surface 25 becomes worn, the nuts 31 may be removed from the bolts 27, and the backing plate 23 reversed so that the threshing surface 26 is provided in place of the threshing surface 25. When the rubber covering 24 is reversed, grain will again be efficiently pulled into the concave and threshed by the threshing surface 26 of the flail bars and the threshing surface 17a of the rubber concaves 17.

From the foregoing description it should be obvious that a novel, quickly replaceable threshing surface has been provided for a thresher cylinder. The rubber threshing surface may be quickly and easily removed from the cylinder and replaced on the cylinder with a new threshing edge. The rubber flail bars are easy to manufacture and can be supplied to the trade at a minimum cost.

While only a preferred construction in which the principle of the present invention has been embodied is herein described, it is to be understood that the invention is not to be limited to the specific detail shown and described, but that, in fact, widely different means may be employed in the practice of the broader aspects of this invention.

What is claimed is:

1. In a thresher, a cylinder, a plurality of threshing means extending generally longitudinally of the cylinder, each threshing means comprising an angle bar having one leg disposed circumferentially of the cylinder and removably secured thereto, the other leg of the angle bar extending radially outwardly from the cylinder, a beater member adapted for removable attachment to the leading face of said radial leg, said member comprising a backing plate having a front flush face and carrying studs on its back face which studs are adapted to pass through a hole formed in the radial leg for attachment thereto, a resilient beater strip bonded to the backing plate on its front flush face and substantially covering said face of the plate and being thickened in cross section along it radial inner and outer edges, and removable means cooperable with said studs whereby the beater member may be reversibly mounted to make the inner edge of the beater strip serve as a beating edge when the outer edge has become worn, both the inner and outer edges and the intermediate portion of the beater strip being exposed to crop material in the original and reversed positions thereof on the said radial leg of the angle bar, the bonding of the beater strip to the backing plate being the sole attachment for the resilient strip thereby exposing its entire surface to crop material free of protuberances.

2. A flail bar adapted for attachment to a thresher cylinder, said bar comprising an angle bar one leg of which is adapted for attachment to the cylinder and the other leg adapted to mount a removable beater member, said member comprising a backing plate having a front flush face and carrying studs on its back face which studs are adapted to pass through a hole formed in said other leg for attachment thereto, a resilient beater strip bonded to the backing plate on its front flush face and substantially covering said face of the plate and being thickened in cross section along its inner and outer edges, and removable means cooperable with said studs whereby the beater member may be reversibly mounted to make the inner edge of the beater strip serve as a beating edge when the outer edge has become worn, both the inner and outer edges and the intermediate portion of the beater strip being exposed to crop material in the original and reversed positions thereof on the said leg of the angle bar, the bonding of the beater strip to the backing plate being the sole attachment for the resilient strip thereby exposing its entire surface to crop material free of protuberances.

EDWARD L. RIETZ.